United States Patent
Jensen et al.

(10) Patent No.: US 6,580,774 B1
(45) Date of Patent: Jun. 17, 2003

(54) METHOD AND APPARATUS TO PERFORM CELL SYNCHRONIZATION IN AN ASYNCHRONOUS TRANSFER MODE NETWORK

(75) Inventors: John Neil Jensen, Los Angeles, CA (US); Harun Muliadi, Thousand Oaks, CA (US); Vardan Antonyan, Glendale, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 09/371,867

(22) Filed: Aug. 5, 1999

(51) Int. Cl.[7] ................................................ H04L 7/00
(52) U.S. Cl. ....................................... 375/364; 375/368
(58) Field of Search ......................... 375/368, 364–366

(56) References Cited

U.S. PATENT DOCUMENTS

| | | | | |
|---|---|---|---|---|
| 4,879,731 A | * | 11/1989 | Brush | 375/368 |
| 5,568,486 A | * | 10/1996 | Huscroft et al. | 370/395.2 |
| 5,799,010 A | * | 8/1998 | Lomp et al. | 370/335 |
| 5,870,444 A | * | 2/1999 | Mynett et al. | 370/294 |
| 5,940,467 A | * | 8/1999 | Fransson | 377/47 |
| 6,212,174 B1 | * | 4/2001 | Lomp et al. | 370/335 |

* cited by examiner

*Primary Examiner*—Stephen Chin
*Assistant Examiner*—Lawrence Williams
(74) *Attorney, Agent, or Firm*—Blakely, Sokoloff, Taylor & Zafman LLP

(57) ABSTRACT

A method and apparatus for synchronizing ATM cells is disclosed. A synchronization unit receives a data clock signal and a plurality of control signals. Based on those signals, a sync pulse is generated. If synchronization is not achieved within a predetermined time period, the sync pulse is shifted one bit location. Through iterative shifting of the sync pulse, synchronization is ultimately achieved.

13 Claims, 5 Drawing Sheets

METHOD AND APPARATUS TO PERFORM CELL SYNCHRONIZATION IN AN ASYNCHRONOUS TRANSFER MODE NETWORK

BACKGROUND

(1) Field of the Invention

The invention relates to network communications. More specifically, the invention relates to synchronization between a frame or in a subdelineation unit.

(2) Background

Two common types of framers are in common use in network communications. A T1 framer is used with T1 communications and generates a framing bit every 193 bits. This framing bit permits a cell delineation unit to identify octet boundaries for an incoming data stream. A single line digital subscriber line (SDSL) framer does not generate a framing bit. Typically, synchronization for SDSL uses serial bit synchronization to perform synchronization on a bit by bit basis. However, in some cases, it is desirable to perform octet aligned synchronization. Absent a framing bit, a cell delineation unit has only a one in eight chance of being in octet aligned synchronization with an SDSL framer. This is particularly problematic in the context of an asynchronous link between the framer and an endpoint from which the data originates. Thus, the problem arises in a context of the system which communicates using asynchronous transfer mode (ATM) cells to communicate between a pair of end points how to assure synchronization when it is unknown whether the remote framer is a T1 framer or an SDSL framer.

BRIEF SUMMARY OF THE INVENTION

A method and apparatus for synchronizing ATM cells is disclosed. A synchronization unit receives a data clock signal and a plurality of control signals. Based on those signals, a sync pulse is generated. If synchronization is not achieved within a predetermined time period, the sync pulse is shifted one bit location. Through iterative shifting of the sync pulse, synchronization is ultimately achieved.

DETAILED DESCRIPTION

Figure 1:
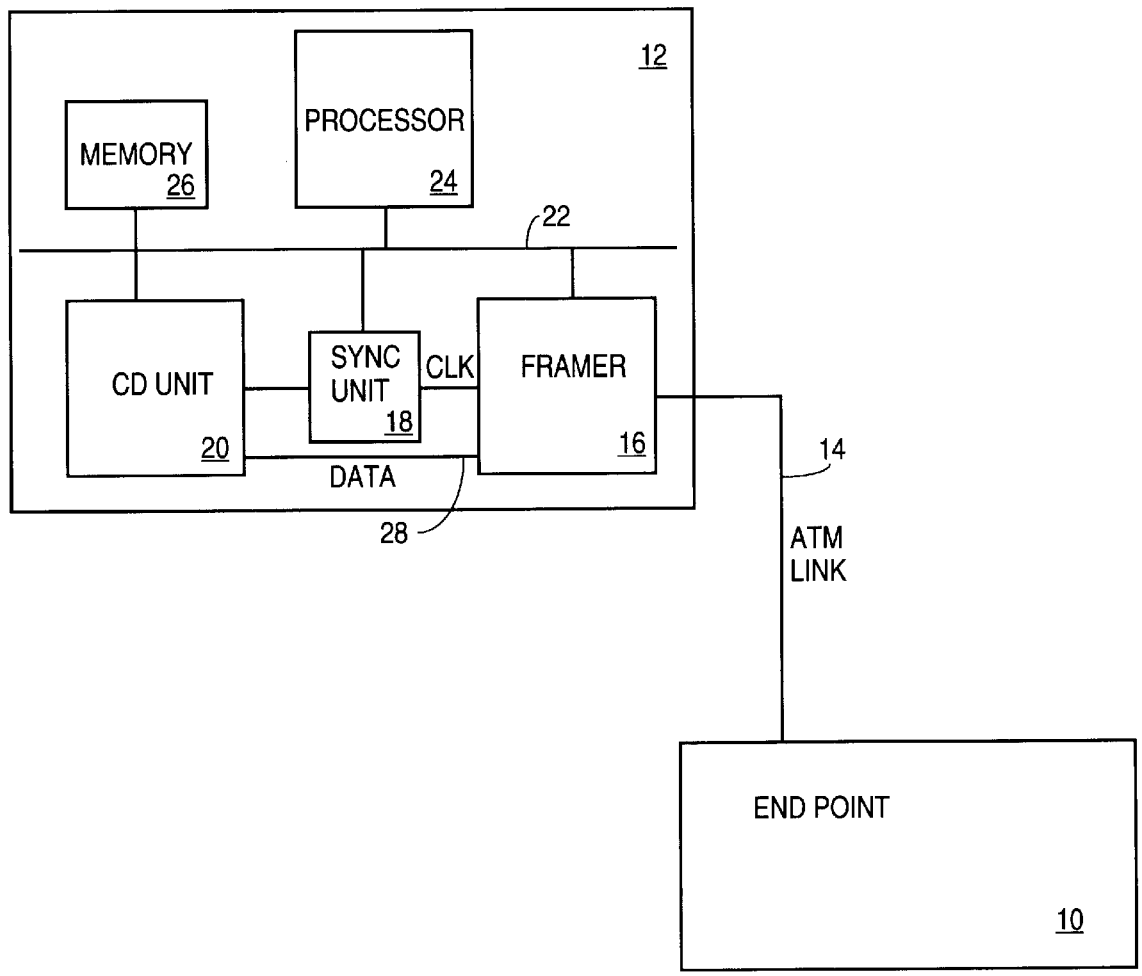
FIG. 1 is a block diagram of one embodiment of a system performing synchronization with an arbitrary framer.

FIG. 1 is a block diagram of one embodiment of a system performing synchronization with an arbitrary framer. A remote end point 10 which may be either a source or recipient of data is coupled by an ATM link 14, which may be a standard twisted pair or any other suitable medium for transferring ATM cells to local endpoint 12. Local endpoint 12 includes a framer 16, a processor 24, memory 22, a sync unit 18, and a cell delineation unit 20. The processor 24 is coupled to a bus 22. Memory 26 is also coupled to bus 22.

Framer 16 frames incoming ATM cells and sends them to the cell delineation unit 20 along data lines 28. Concurrently, a data clock is sent to a sync unit 18 which, in turn, generates a sync pulse that is provided to cell delineation unit 20. The cell delineation unit 20 performs a check sum over the cell. If the check sum is valid for six cells, synchronization is achieved. The processor 24 controls a synchronization unit as described in more detail below. The type of framer 16 may be identified by software executing on the processor. The processor may, for example, deselect the synchronization unit where the framer is a T1 framer, since the sync pulse is provided automatically along the data lines 28. Where the framer 16 is an SDSL framer, synchronization unit 18 has a one in eight chance of generating a sync pulse and an octet aligned. If after a predetermined time period, the cell delineation unit 20 has not synchronized with the incoming cells, the sync unit 18 shifts the synchronization pulse one bit. Thus, a maximum of seven shifts may be required to ensure synchronization. Typically, it takes six cells for the cell delineation unit 20 to determine if synchronization is achieved. Thus, in a worst case, forty-eight cell times may be required to achieve synchronization. Notably, cells using the synchronization process are empty cells or unused cells so that no data is lost during synchronization. It is only after synchronization is achieved that the endpoint 10 is permitted to send actual payload cells over the ATM link 14. In one embodiment, the endpoint 10 repeatedly sends empty cells between actual payloads to ensure that connection and synchronization are maintained.

Figure 2:
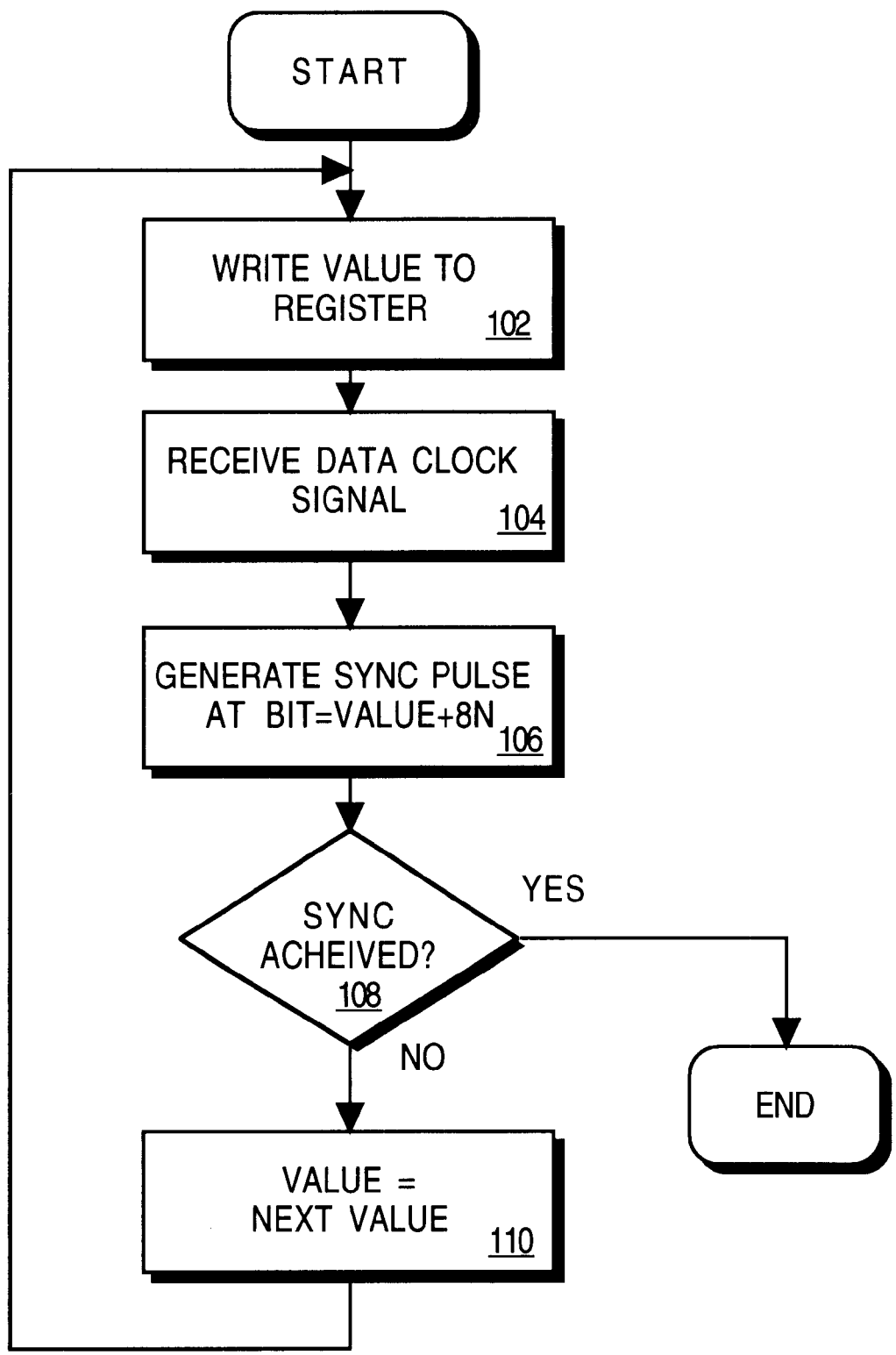
FIG. 2 is a flow chart of operation in one embodiment.

FIG. 2 is a flow chart of operation in one embodiment. At functional block 102, a value is written to a register. At functional block 104, the synchronization unit receives a data clock signal. At functional block 106, the synchronization unit generates a sync pulse at a bit equal to the value and every eighth bit location thereafter. A determination is made at decision block 108 whether synchronization has been achieved. If synchronization has not been achieved, then the value is incremented by one and a new attempt at synchronization is made. As synchronization is achieved, then the synchronization unit merely continues to generate synchronization pulses at every eighth bit location.

Figure 3:
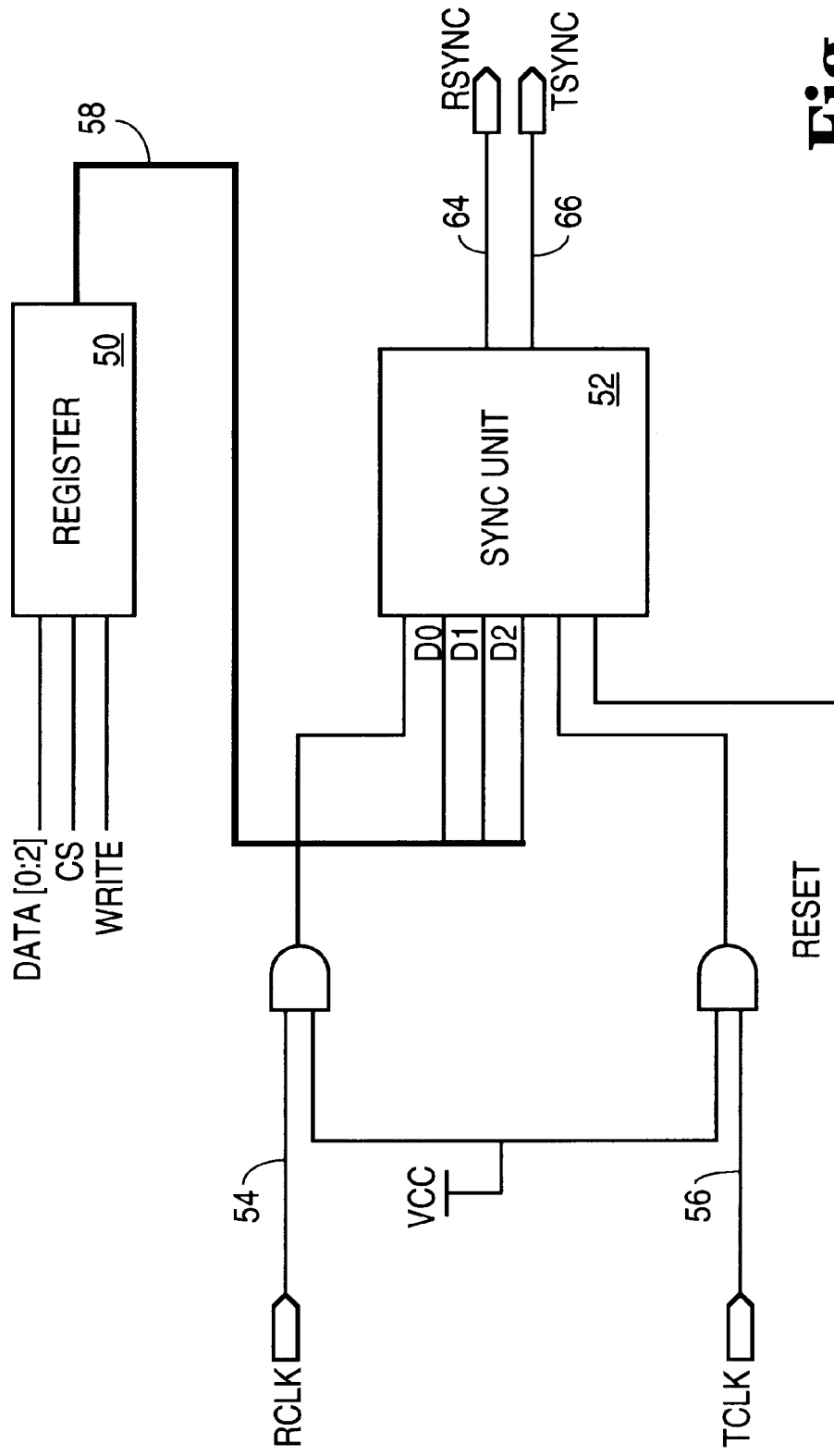
FIG. 3 is a schematic diagram of one embodiment of a sync unit and control register.

FIG. 3 is a schematic diagram of one embodiment of a sync unit and control register. Register 50 is written with a value that indicates a bit location at which the sync pulse generated by the synchronization unit 52 will occur. The value is provided to sync unit 52 across data lines 58. Synchronization unit 52 receives a receive clock 54 corresponding to data being received by the local endpoint and a transmit clock 56 corresponding to data being transmitted by the local endpoint. Sync unit 52 generates both a receive sync signal 64 and a transmit sync signal 66.

Figure 4A:
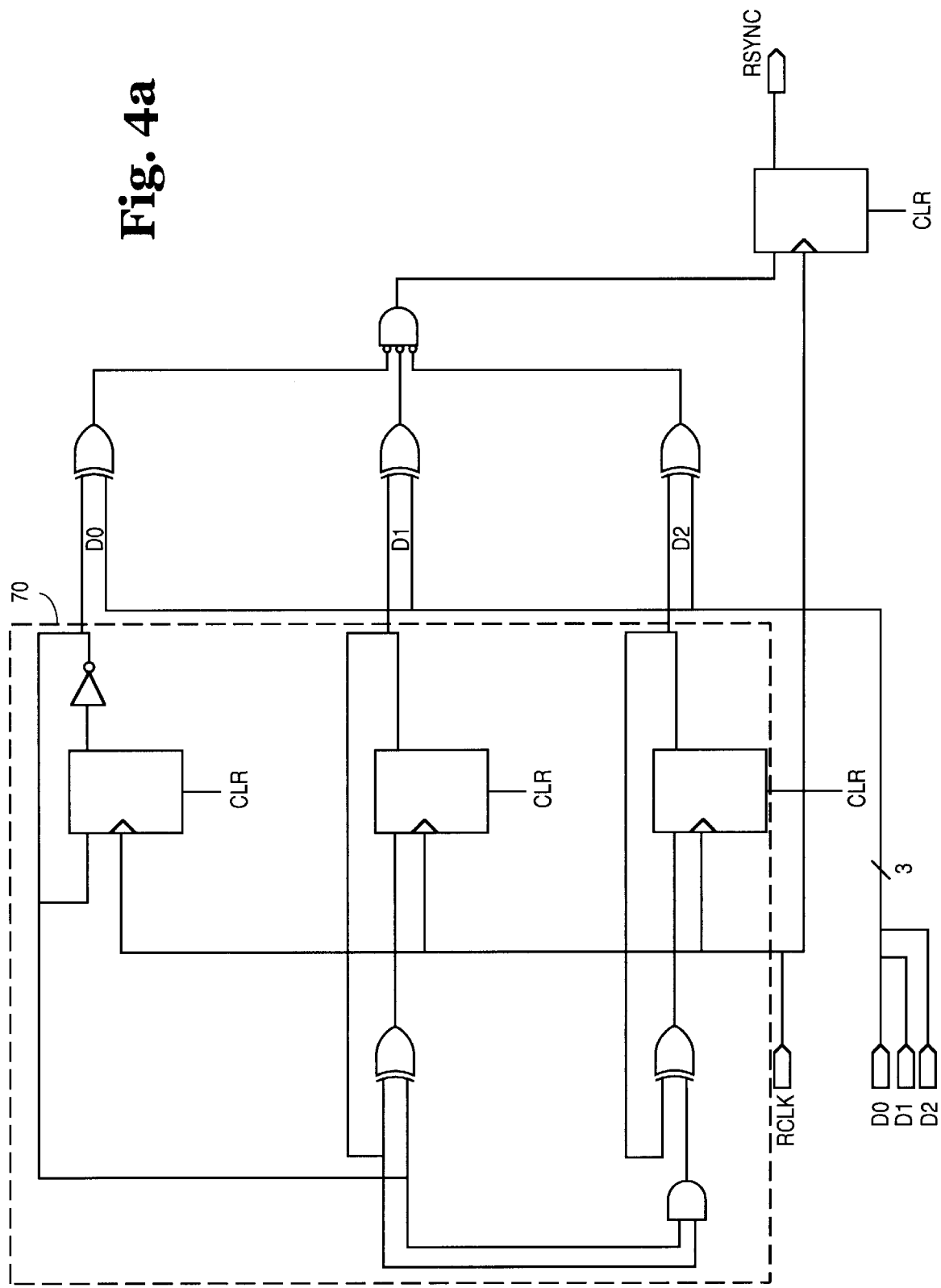
FIG. 4a is a schematic diagram of a receive portion of one embodiment of a sync unit of FIG. 3.

FIG. 4a is a schematic diagram of a receive portion of one embodiment of a sync unit of FIG. 3. A three bit counter 70 is employed in conjunction with combinational logic comprising three exclusive OR gates and a negated AND to generate the appropriate synchronization signal. Control signals $D_0$, $D_1$, and $D_2$ corresponded to the values in corresponding bit locations of the data which varies between zero and seven, as required to reach synchronization. For example, if the processor initially writes a 0, 0, 0 as the value into register 50, the sync pulse will be generated concurrently with the first receive clock pulse and every eighth receive clock pulse thereafter. If synchronization is not achieved, register 50 may be rewritten with 0,0,1, thereby shifting the synchronization pulse by one bit location. This rewriting of the bit register and shifting of the bit location may occur up to seven times, until synchronization is achieved.

Figure 4B:
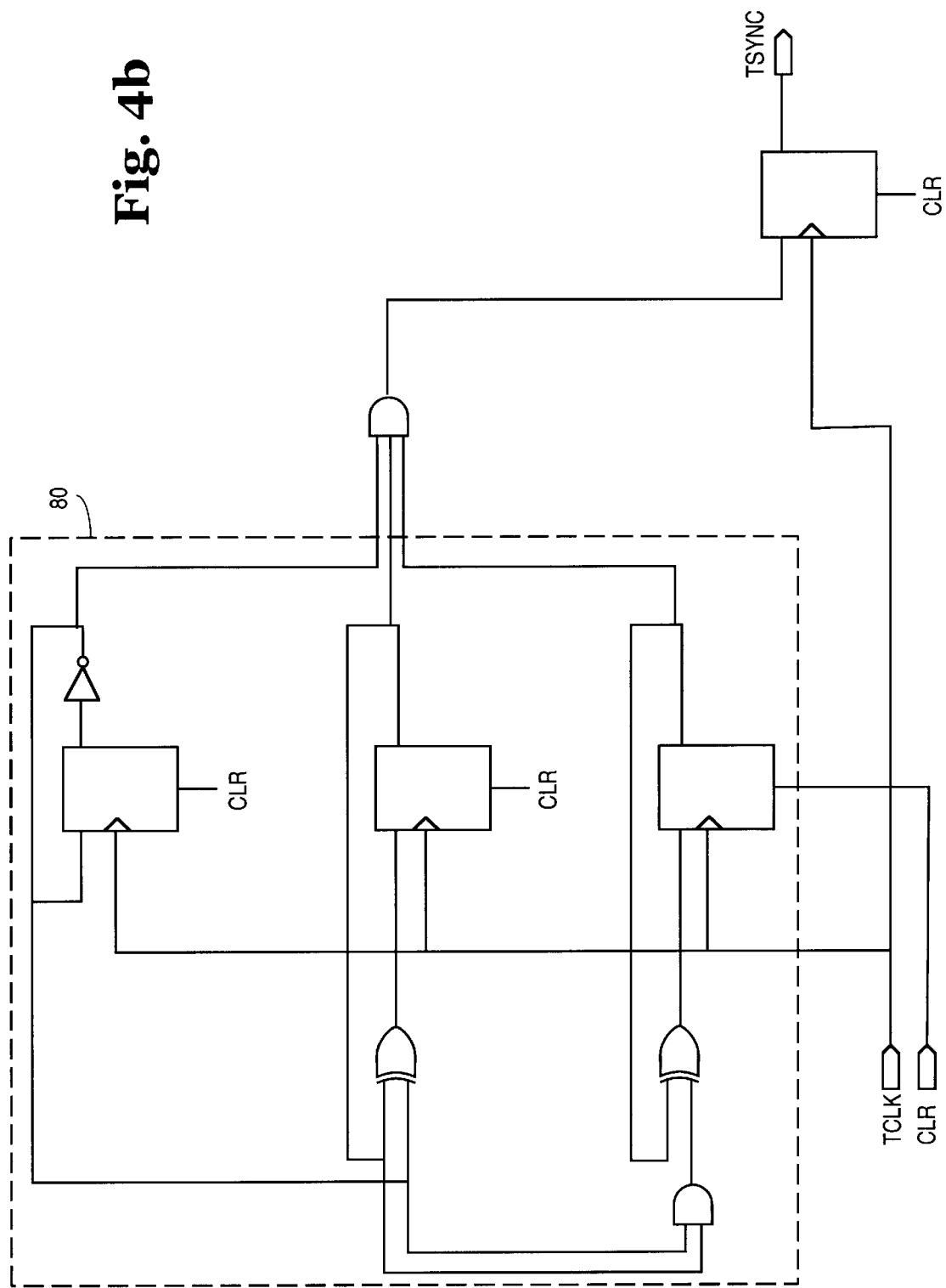
FIG. 4b is a schematic diagram of a transmit side of one embodiment of the sync unit of FIG. 3.

FIG. 4b is a schematic diagram of a transmit side of one embodiment of the sync unit of FIG. 3. A three bit counter 80 is employed in conjunction with an AND gate to generate a sync pulse every eighth bit location. Unlike the receive side, there is no necessity to shift the synchronization pulse. Since the data source is local, octet alignment is achieved by requiring a sync pulse on the eighth transmit clock pulse.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:

a synchronization unit to receive a clock for an incoming bit stream, the synchronization unit to generate a synchronization pulse to identify boundaries for the incoming bit stream; and a register coupled to the synchronization unit programmable to hold a value, the value dictating a location of the synchronization pulse in an eight bit series of the incoming bit stream, the register indicating a boundry location once synchronization is achieved.

2. The apparatus of claim 1 wherein the synchronization unit comprises a first counter and a plurality of XOR gates coupled to the first counter.

3. The apparatus of claim 2 wherein the first counter is a three bit counter.

4. A method comprising:

generating a first synchronization pulse at a bit location, defined by a stored value, and a plurality of additional bit locations eight bits distant from each predecessor sync pulse;

determining if synchronization has been achieved; and if synchronization is not achieved, iteratively shifting the bit location of the sync pulse until synchronization is achieved.

5. The method of claim 4, wherein iteratively shifting further comprises:

generating a synchronization pulse at a bit location, defined by a stored value, and a plurality of additional bit locations eight bits distant from each predecessor sync pulse;

determining whether a predetermined time period has expired;

determining if synchronization has been achieved once the predetermined time period expires; and repeating the generating, determining and determining until synchronization is achieved.

6. The method of claim 4 wherein determining further comprises:

performing a check sum over a plurality of identified cells of an incoming data stream; and achieving synchronization when the check sum is valid over a predetermined number of the identified cells of the incoming data stream.

7. A system comprising:

a framer coupled to a remote endpoint;

a cell delineation unit coupled to the framer; and a synchronization unit coupled between the framer and the cell delineation unit to iteratively generate a sync pulse responsive to a data clock from the framer by shifting a bit location of the sync pulse within a cell until synchronization is achieved.

8. The system of claim 7 further comprising:

a processor;

a memory coupled to the processor; and a register writable by the processor, the register to hold a value indicating a bit location of the sync pulse within a bit string.

9. An apparatus comprising:

a synchronization unit including a first counter and a plurality of XOR gates coupled to the first counter and a second counter coupled to an AND gate, the synchronization unit to receive a clock for an incoming bit stream and to generate a synchronization pulse; and a register coupled to the synchronization unit programmable to hold a value, the value dictating a location of the synchronization pulse in an eight bit series.

10. The apparatus of claim 9 wherein the first counter is responsive to a receive data clock and the second counter is responsive to a transmit data clock.

11. An apparatus comprising:

a synchronization unit including a first counter and a plurality of XOR gates coupled to the first counter, the synchronization unit to receive a clock for an incoming bit stream and to generate a synchronization pulse; and a register coupled to the synchronization unit programmable to hold a value, the value dictating a location of the synchronization pulse in an eight bit series, wherein the XOR gates receive as inputs the three bits from the first counter and three control signals from the register.

12. A method comprising:

generating a first synchronization pulse at a first bit location, defined by a supplied value, and a plurality of additional bit locations eight bits distant from each predecessor sync pulse;

determining if synchronization has been achieved; and generating a second synchronization pulse at a second bit location if synchronization is not achieved; and iteratively shifting the bit location of the sync pulse when synchronization is not achieved within a predetermined time period.

13. A method comprising:

generating a first synchronization pulse at a first bit location, defined by a supplied value, and a plurality of additional bit locations eight bits distant from each predecessor sync pulse;

determining if synchronization has been achieved;

generating a second synchronization pulse at a second bit location if synchronization is not achieved;

wherein generating a first sync pulse comprises writing a value to register, and employing the value to specify the first bit location; and wherein generating a second sync pulse comprises writing a next value to the register and employing the next value to specify the second bit location.

* * * * *